United States Patent
Markus et al.

(10) Patent No.: US 10,235,309 B1
(45) Date of Patent: Mar. 19, 2019

(54) COMBINED CONTROL FOR MULTI-DIE FLASH

(71) Applicant: Western Digital Technologies, Inc., San Jose, CA (US)

(72) Inventors: Yoav Markus, Tel-Aviv (IL); Alexander Bazarsky, Holon (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/824,658

(22) Filed: Nov. 28, 2017

(51) Int. Cl.
G06F 13/00 (2006.01)
G06F 13/16 (2006.01)
G06F 11/30 (2006.01)
G06F 13/42 (2006.01)
G06F 3/06 (2006.01)

(52) U.S. Cl.
CPC ...... *G06F 13/1642* (2013.01); *G06F 11/3027* (2013.01); *G06F 11/3051* (2013.01); *G06F 13/4282* (2013.01); *G06F 3/0659* (2013.01)

(58) Field of Classification Search
CPC .......................... G06F 13/1642; G06F 3/0659
See application file for complete search history.

(56) References Cited

U.S. PATENT DOCUMENTS

2008/0297199 A1* 12/2008 Grunzke .............. G11C 7/1045
326/87
2015/0187399 A1* 7/2015 Tuers ...................... G11C 7/22
711/103

* cited by examiner

*Primary Examiner* — Zachary K Huson
(74) *Attorney, Agent, or Firm* — Patterson & Sheridan, LLP; Steven Versteeg (57) ABSTRACT

A method, having steps of monitoring a bus for a change in an aggregated ready/busy indicator from a busy status to a ready status, the change in the aggregated ready/busy indicator to the ready status indicating at least one die is ready to perform a computer function, scheduling at least one logic queue with a next command to the ready die when the aggregated ready/busy indicator is in a ready status and setting the aggregated ready/busy indicator to a busy status after the scheduling of the at least one logic queue.

18 Claims, 5 Drawing Sheets

COMBINED CONTROL FOR MULTI-DIE FLASH

FIELD

Aspects relate to controlling operations within a computer architecture. More specifically, aspects relate to controlling operations within a computer architecture by obtaining status of computer components with minimal waste of clock cycles and computer resources.

BACKGROUND

Field

The capacity throughput of computer devices continues to grow with additional demands being placed upon successive computer systems. Conventional systems, while good at several processes, are continually improved to keep pace with the additional demands of users.

One such conventional process that is used is to determine the status of individual dies during computer activities. In some instances, as there may be a lack of parallelism, certain dies may have excessively long queues for future activities, while other certain dies may have little or no activities. In order to process needed activities to dies that would provide greater added benefit to the end user if completed first, scheduling of such processes in an accurate process is necessary.

Figure 1:
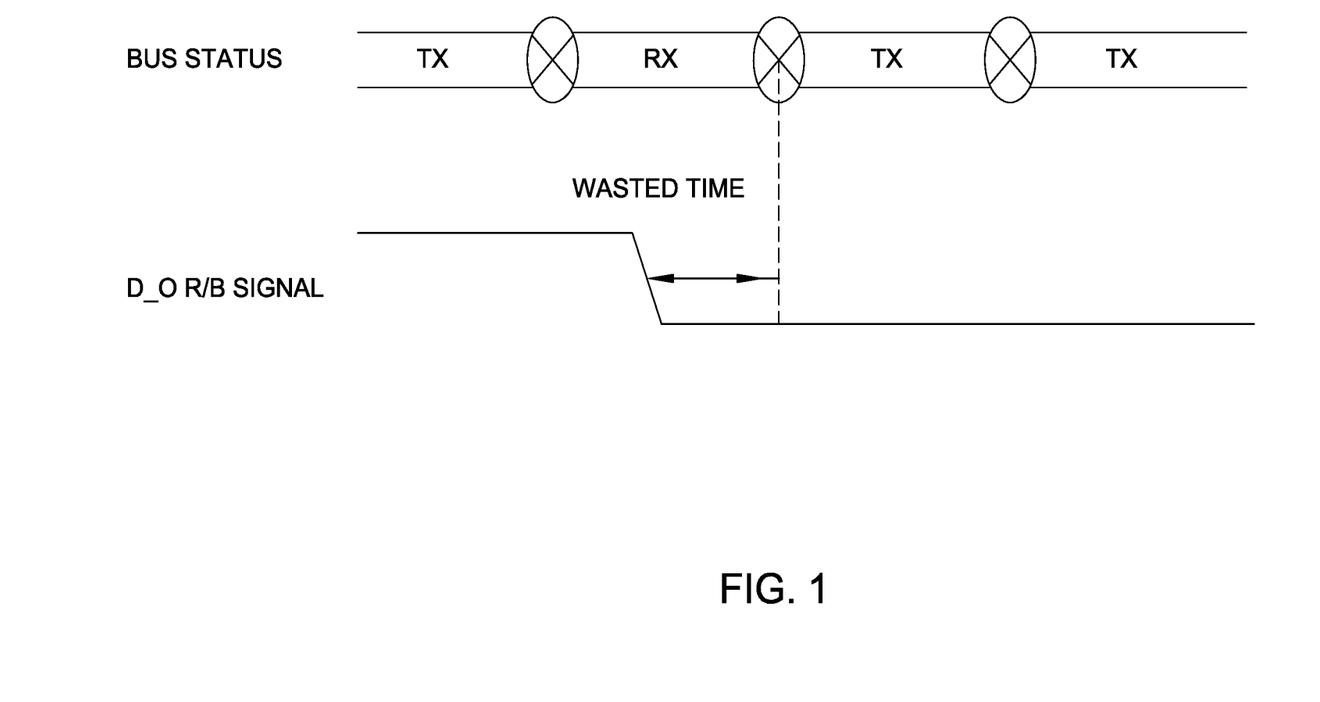
FIG. 1 is a bi-level diagram of common bus status and ready/busy signal for a conventional computer architecture system in prior art configuration.

To obtain a status update for each die, a general "get status" request is transmitted over a shared data bus. This occurs when the shared data bus is free, i.e. (in between commands or transactions that are being conducted). Referring to FIG. 1, a multi-layer diagram is provided that illustrates a top bus status level and a secondary ready/busy signal level. As provided in FIG. 1, the conventional or prior art, method of bus transactions is illustrated in the top layer. Each transaction is illustrated on the common bus by a Tx designation. FIG. 1 provides three (3) such transactions. In conventional systems, a die status can only be obtained when the common bus is free, thus there are three such instances where a die status can be obtained. In the conventional process, a scheduler wastes undetermined time as the scheduler waits for the next time-window where the bus will be free to check a die status and make decisions on the next command to schedule and transmit to dies. The amount of time that is wasted is noted as wasted time on the R/B signal graph.

The wasted time, illustrated in the second level of FIG. 1, is applicable to storage class memory or other types of memory.

There is a need to provide an arrangement for determining a die status that reduces wasted time compared to conventional systems.

There is an additional need to provide a method for determining a die status that reduces wasted time compared to conventional systems.

There is a further need to provide a method and arrangement for determining die status that reduces latency and power requirements compared to conventional systems.

There is a still further need to provide an arrangement that is cost effective for determining die status.

SUMMARY

So that the manner in which the above recited features of the present disclosure can be understood in detail, a more particular description of the disclosure, briefly summarized below, may be had by reference to embodiments, some of which are illustrated in the appended drawings. It is to be noted that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In a first non-limiting embodiment a method is disclosed comprising: monitoring a bus for a change in an aggregated ready/busy indicator from a busy status to a ready status, the change in the aggregated ready/busy indicator to the ready status indicating at least one die is ready to perform a computer function; scheduling at least one logic queue with a next command to the ready die when the aggregated ready/busy indicator is in a ready status and setting the aggregated ready/busy indicator to a busy status after the scheduling of the at least one logic queue.

In another non-limiting embodiment, an arrangement for monitoring is disclosed comprising at least two dies configured to perform at least one computer function, a common resistor connected to the at least two dies and an analog to digital converter connected to the at least two dies.

In another non-limiting embodiment, a method is disclosed comprising determining a die ready for performing a computer operation, turning on a combined chip enable signal, the combined chip enable signal indicating a die number for selection of the next operation, transmitting the computer operation, receiving the computer operation at the die number selected and performing the computer operation at the die number selected.

In another non-limiting embodiment, an arrangement is disclosed comprising means for monitoring a bus for a change in an aggregated ready/busy indicator from a busy status to a ready status, the change in the aggregated ready/busy indicator to the ready status indicating at least one die is ready to perform a computer function, means for scheduling at least one logic queue with a next command to the ready die when the aggregated ready/busy indicator is in a ready status and means for setting the aggregated ready/busy indicator to a busy status after the scheduling of the at least one logic queue.

In another non-limiting embodiment, an arrangement is disclosed comprising means for determining a die ready for performing a computer operation, means for turning on a combined chip enable signal, the combined chip enable signal indicating a die number for selection of the next operation, means for transmitting the computer operation, means for receiving the computer operation at the die number selected and means for performing the computer operation at the die number selected.

In another non-limiting embodiment, a method is disclosed comprising: monitoring a bus for a change in an aggregated ready/busy indicator from a busy status to a ready status for at least one die, the change in the aggregated ready/busy indicator to the ready status indicating at least one die is ready to perform a computer function, scheduling at least one logic queue with a next command to the ready die when the aggregated ready/busy indicator is in a ready status, setting the ready/busy indicator for at least one die to a busy status after the scheduling of the at least one logic queue, setting the aggregated ready/busy indicator to a busy indication which reflects a status of all dies; and monitoring the bus for a second change in an aggregated ready/busy indicator from the busy status to the ready status, wherein the change in the aggregated ready/busy indicator to the ready status indicates at least one die is ready to perform a second computer function.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of an inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

The aspects of the description apply to computers and more specifically, aspects of controlling computers or computer connected devices such that the devices perform in an optimal method of operation. The aspects described relate to a host that controls other devices, such as a data storage arrangement. Data storage arrangements may be, for example, disk drives, hybrid disk drive, NAND flash units and other similar arrangements.

In the embodiments described, a data storage arrangement is connected to a host system through an interface, such as a personal computer or a server so the personal computer may transmit and receive data from the data storage arrangement. The function of the data storage arrangement is to accept and store data until the data is needed by a user or the host. The data storage arrangement may have to accept large bursts of data at a rapid pace, depending on the computer processes performed, therefore the data storage arrangement is configured with multiple memory units that provide for various states of usage.

Certain sections of the data storage arrangement may be configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. The data storage arrangement may have an interface that allows the data storage arrangement to connect with the host and allow for synchronization of the host and the data storage arrangement. The interface may be a SATA compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection.

Auxiliary connections may be provided to the data storage arrangement to allow for addition options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

A controller is provided to control actions of the data storage arrangement as required by the host. The controller may also be configured to perform maintenance activities for the data storage arrangement to allow for efficient use. The controller may be provided with code that interfaces with the internal software of the data storage arrangement to allow the controller to perform the various functions required. The controller, for example, may interact with the dies of the data storage device to allow for reading or writing of data to the data storage device.

In one aspect described, a method is proposed to use an aggregated status indicator for control signals used in a computer architecture. This indicator provide instant full die status information to a controller by a dedicated hard wired circuit. This arrangement improves the scheduling and transmits the next task required to be performed by a computer architecture to the next free die via a shared bus with no polling and no addition pads and wire routings.

Figure 2:
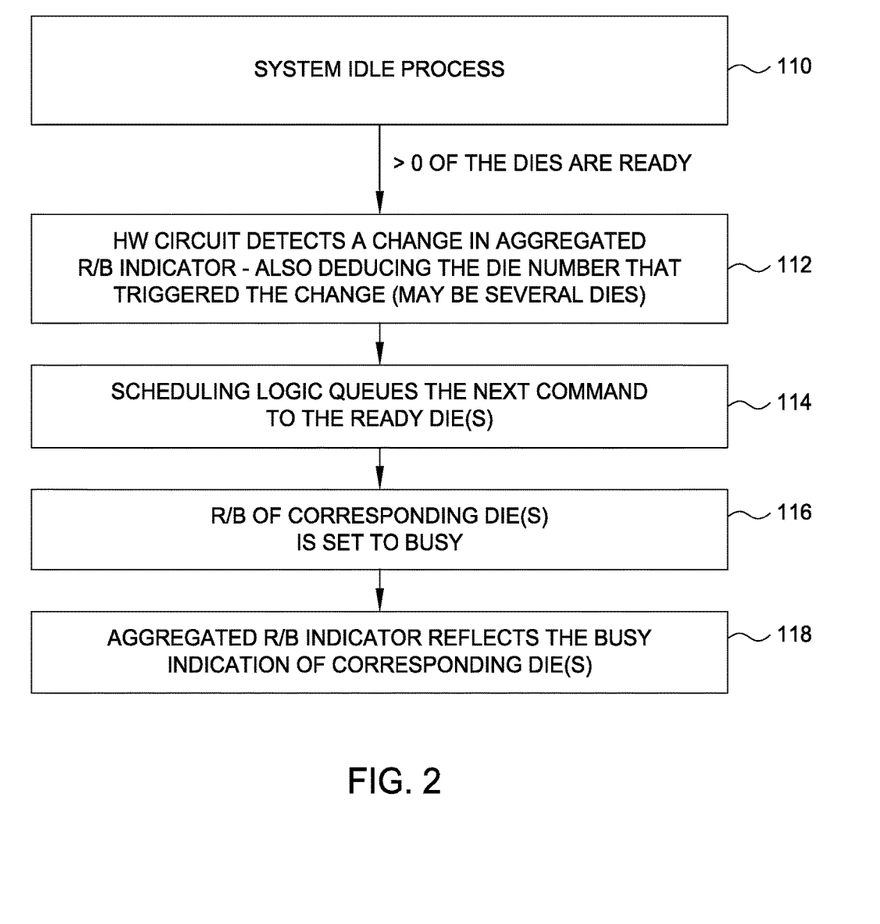
FIG. 2 is a flowchart for a method of a scheduling system that uses a ready/busy signal indicator.

Referring to FIG. 2, a method 100 for just in time polling synchronized bus utilization for a multi-die flash is illustrated. At 110, the method calls for determining if a system idle process has occurred wherein at least one of the dies of a storage device are idle and ready to begin a process. At 112, a hardware circuit detects a change in an aggregated ready/busy indicator. From this ready/busy indicator it may be deduced a die number that triggered the change in the ready/busy indicator. At 114, a scheduling logic queues the next command to the ready die(s) as provided by the ready/busy indicator in 112. At 116, the ready/busy indicator of the corresponding die is then set to busy. At 118, the aggregated ready/busy indicator reflects the busy indication of the corresponding die(s).

Figure 3:
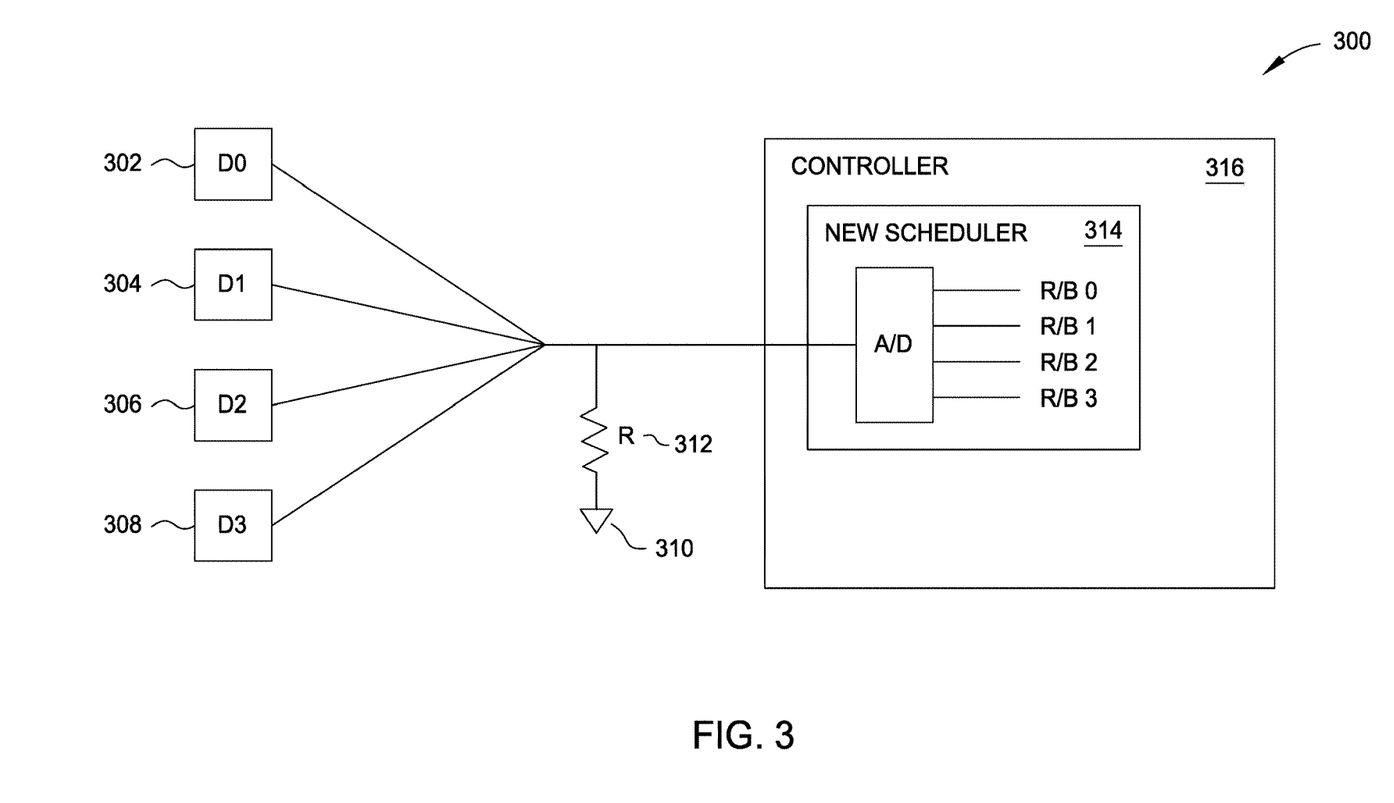
FIG. 3 is an arrangement with four (4) dies connected to a controller that uses a ready/busy signal indicator as provided in FIG. 2

Referring to FIG. 3, multiple dies D0 302, D1 304, D2 306 and D3 308 are illustrated connected to the controller 312 and specifically the scheduler 314. Each of the dies 302, 304, 306 and 308 are connected to an analog line with attached resistor 312 as well as an analog to digital converter placed within the new scheduler 314. Such a configuration allows for information to be passed from the individual dies D0 302, D1 304, D2 306 and D3 308 to the controller 312 to allow the controller 312 to identify the status of the dies. As illustrated in FIG. 3, each of the dies 0, 1, 2 and 3 have a ready/busy profile that is created by the analog to digital converter within the scheduler 314.

Figure 4:
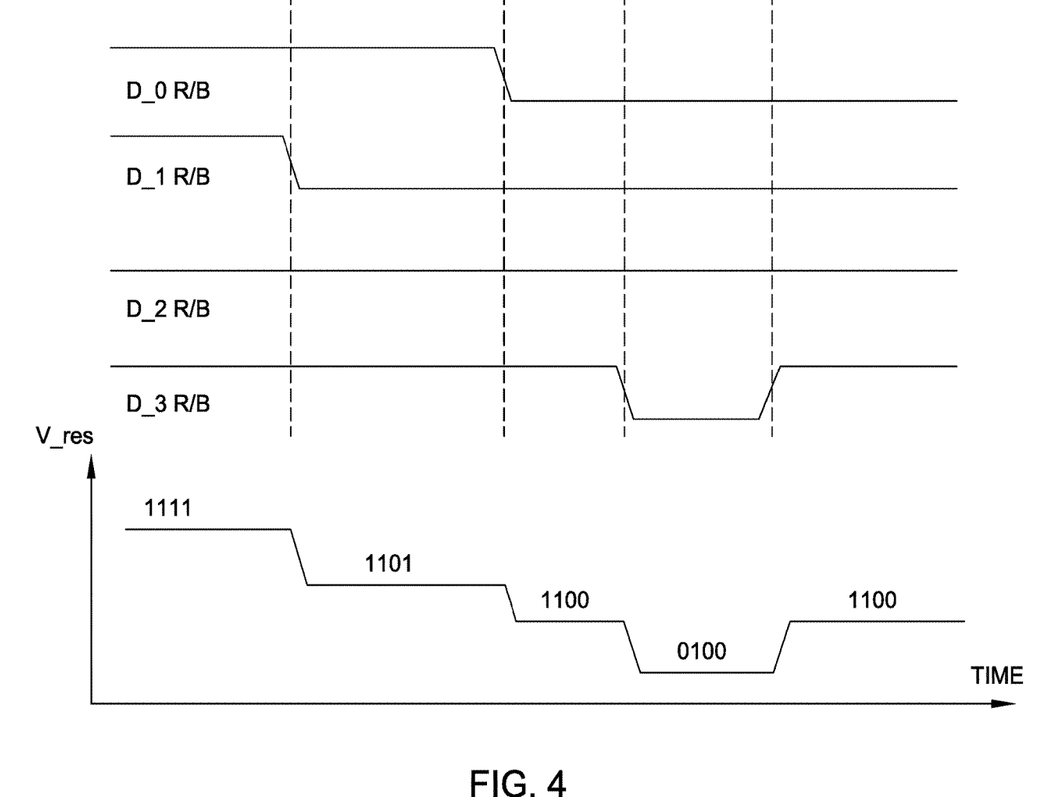
FIG. 4 provides four ready/busy profiles for dies provided in FIG. 3.

Referring to FIG. 4, the ready/busy profile for each of dies 0, 1, 2, and 3 are illustrated. The vertical axis measures the V_res and the horizontal axis measures time. The ready/busy (R/B) profiles of four dies is illustrated below in FIG. 4. FIG. 4 illustrates that we can code the status of the die system can be coded by currents driven by each die through a common resistor and next convert the analog voltage using an A/D converter to binary levels, giving the scheduler an instant full R/B status of all dies. Each die drives a current proportional to $2^n$, where n is its number in the die-stack.

Figure 5A:
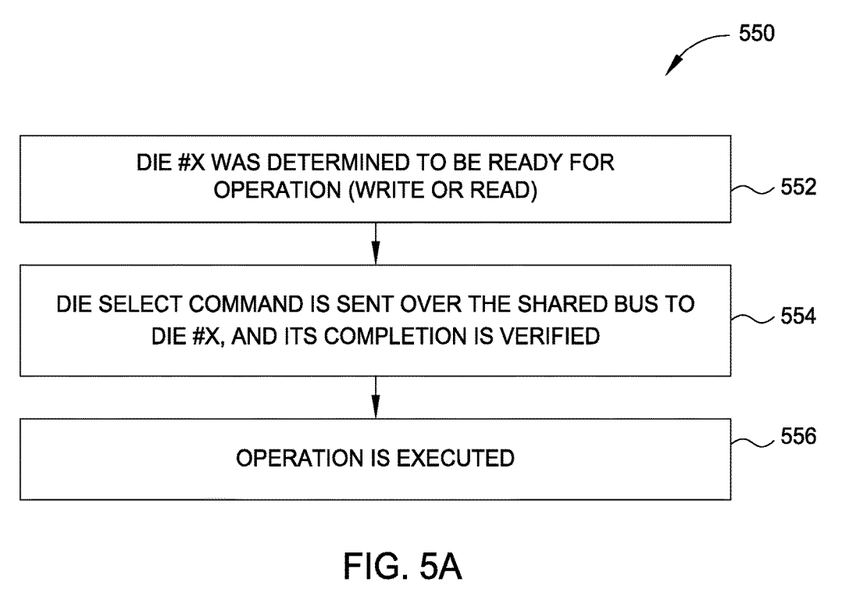
FIG. 5a is a flow chart showing a prior art method for die selection.

Referring to FIG. 5a, a method 550 is illustrated for a conventional apparatus that performs an operation at a die. In 552 a die number is determined to be ready for operation. The operation could be a write operation or a read operation. In 554, a die select command is sent over a shared bus to the specific die number that is determined to be ready in 552. The operation is then executed at the specific die number determined to be ready for operation from 552.

Figure 5B:
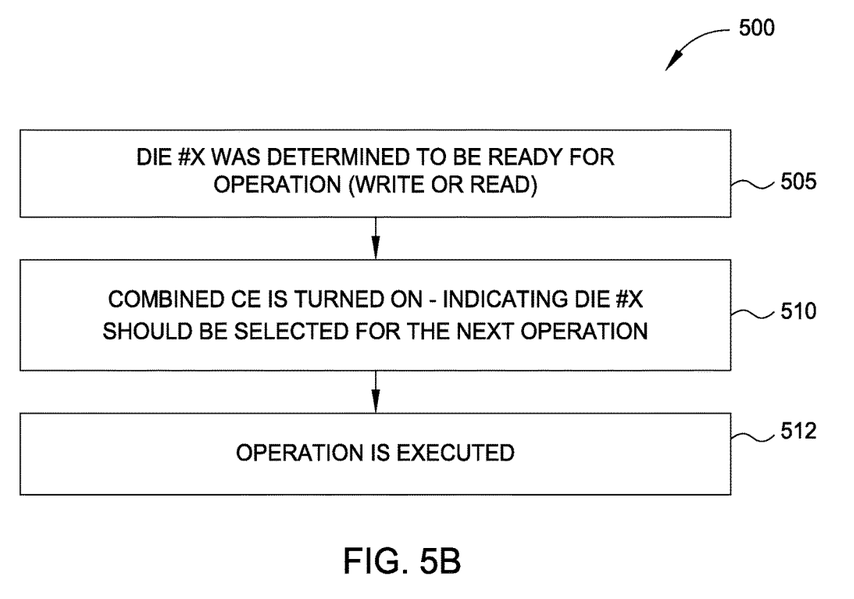
FIG. 5b is a flow chart for selection for die selection using a combined chip enabled signal in one non-limiting embodiment.

Referring to FIG. 5b, a method 500 for determining the status for combined control of a multi-die flash arrangement. In 505, a die number is determined to be ready for operation. The operation could be a write operation or a read operation. In 510, a combined CE signal is turned on, indicating which die number should be selected for the next operation. At 512, the operation is then executed at the indicated die.

In conventional apparatus, a separate command is used to select the next die for operation, which includes latency overhead and power consumption. In the aspects illustrated, a signal is used that is constantly passed to all dies. The dies interpret this signal in a way similar to the one proposed in FIGS. 3 and 4, thus concluding which die should be the target of the next passed command.

Using both described embodiments may result in gains of cost, power and performance. In terms of the controller area and packaging complexity, the proposed feature requires only a single pad on the controller and a common wire running through all the dies R/B pad. This is in contrast with the trivial solution of wiring each individual die R/B pad to a separate pad on the controller. Assuming and 8 die device, the area saving of 7 pads can be at the order of 0.1 mm^2 along the edge of the controller. This area gain can be attributed to each of the embodiments.

The indicator may also be used in a method for use of a combined chip enable (CE) signal in order to avoid selecting the die through a dedicated command.

The value should be fixed per operation, and the faster the system is, the greater the gain that the method and apparatus provides. In the illustrated embodiments, therefore, high-end devices that gain the most from reductions in overhead.

TABLE 1

| Bus Speed [MB/s] | Transfer time [us] | Reduced overhead-estimated [us] | Gain [%] |
| --- | --- | --- | --- |
| 553 | 70 | 2 | 2.85 |
| 800 | 45 | 2 | 4.4 |
| 1066 | 35 | 2 | 5.7 |

As provided in Table 1, latency gains are achieved by using combined R/B and CE signals instead of conventional signals of "get status" and "die select" commands. The aspects provided allow for power saving benefits by avoiding the need to poll dies with a "get status" command in conventional apparatus. There are also power savings for not having to use a "select die" command, as described above. By having only one dies CE signal asserted at any time, the other die's command decoding circuits are turned off and more power is saved. Power is also saved by a more efficient bus utilization. In the embodiments described, the methods and apparatus apply to not only non-volatile memory components as well as computer components. The embodiments described, therefore are merely illustrative and should not be considered limiting.

In one non-limiting embodiment, a method is disclosed comprising monitoring a bus for a change in an aggregated ready/busy indicator from a busy status to a ready status, the change in the aggregated ready/busy indicator to the ready status indicating at least one die is ready to perform a computer function, scheduling at least one logic queue with a next command to the ready die when the aggregated ready/busy indicator is in a ready status and setting the aggregated ready/busy indicator to a busy status after the scheduling of the at least one logic queue.

In another non-limiting embodiment the method may further comprise deducing a die number from the monitoring of the bus.

In another non-limiting embodiment, the method according to claim 1, wherein the bus is a common bus.

In another non-limiting embodiment, the method may further comprising performing the computer function at the ready die.

In another non-limiting embodiment, the method may further comprise resuming the monitoring of the bus.

In another non-limiting embodiment, the method may be performed wherein the monitoring of the bus is through a controller.

In another non-limiting embodiment, an arrangement for monitoring is disclosed comprising: at least two dies configured to perform at least one computer function;

a common resistor connected to the at least two dies and an analog to digital converter connected to the at least two dies.

In another non-limiting embodiment, a method is disclosed comprising: determining a die ready for performing a computer operation, turning on a combined chip enable signal, the combined chip enable signal indicating a die number for selection of the next operation, transmitting the computer operation, receiving the computer operation at the die number selected and performing the computer operation at the die number selected.

In another non-limiting embodiment, a method may be performed wherein the transmitting the computer operation is performed on a computer bus.

In another non-limiting embodiment, the method may be performed wherein the computer bus is a common computer bus.

In a still further embodiment, the method performed may further comprise turning off the combined chip enable signal after the performing of the computer operation at the die number selected.

In another example embodiment, the method may further comprise determining a second die ready to perform a second computer operation.

In another non-limiting embodiment, the method may further comprise turning on the combined chip enable signal, the combined chip enable signal indicating a second die number for selection of the next operation, transmitting a second computer operation, receiving the second computer operation at the die number selected and performing the second computer operation at the die number selected.

In another non-limiting embodiment, an arrangement is disclosed having means for monitoring a bus for a change in an aggregated ready/busy indicator from a busy status to a ready status, the change in the aggregated ready/busy indicator to the ready status indicating at least one die is ready to perform a computer function, means for scheduling at least one logic queue with a next command to the ready die when the aggregated ready/busy indicator is in a ready status and means for setting the aggregated ready/busy indicator to a busy status after the scheduling of the at least one logic queue.

In another non-limiting embodiment, an arrangement is disclosed having means for determining a die ready for performing a computer operation, means for turning on a combined chip enable signal, the combined chip enable signal indicating a die number for selection of the next operation, means for transmitting the computer operation, means for receiving the computer operation at the die number selected and means for performing the computer operation at the die number selected.

In another non-limiting embodiment, a method is disclosed comprising: monitoring a bus for a change in an aggregated ready/busy indicator from a busy status to a ready status for at least one die, the change in the aggregated ready/busy indicator to the ready status indicating at least one die is ready to perform a computer function, scheduling at least one logic queue with a next command to the ready die when the aggregated ready/busy indicator is in a ready status, setting the ready/busy indicator for at least one die to a busy status after the scheduling of the at least one logic queue, setting the aggregated ready/busy indicator to a busy indication which reflects a status of all dies; and monitoring the bus for a second change in an aggregated ready/busy indicator from the busy status to the ready status, wherein the change in the aggregated ready/busy indicator to the ready status indicates at least one die is ready to perform a second computer function.

In another embodiment, the method may further comprise deducing a die number from the monitoring of the bus.

In a still further embodiment, the method may be performed wherein the bus is a common bus.

In a still further embodiment, the method may further comprise performing the computer function at the ready die.

In a still further embodiment, the method may be performed where the computer function is at least one of a write and read function for a data storage arrangement.

While embodiments have been described herein, those skilled in the art, having benefit of this disclosure will appreciate that other embodiments are envisioned that do not depart from the inventive scope of the present application.

Accordingly, the scope of the present claims or any subsequent related claims shall not be unduly limited by the description of the embodiments described herein.

What is claimed is:

1. A method, comprising:
   monitoring a bus for a change in an aggregated ready/busy indicator from a busy status to a ready status, the change in the aggregated ready/busy indicator to the ready status indicating at least one die is ready to perform a computer function;
   scheduling at least one logic queue with a next command to the ready die when the aggregated ready/busy indicator is in a ready status;
   transmitting the next command to all of the dies;
   setting the aggregated ready/busy indicator to a busy status after the scheduling of the at least one logic queue and transmitting the next command to all of the dies through a chip enable signal;
   receiving the next command at all of the dies; and
   performing the next command at one of the dies.

2. The method according to claim 1, further comprising:
   deducing a die number from the monitoring of the bus.

3. The method according to claim 1, wherein the bus is a common bus.

4. The method according to claim 1, further comprising performing the computer function at the ready die.

5. The method according to claim 4, further comprising:
   resuming the monitoring of the bus.

6. The method according to claim 1, wherein the monitoring of the bus is through a controller.

7. A method, comprising:
   determining a die ready for performing a command;
   scheduling at least one logic queue with the command to the ready die when an aggregated ready/busy indicator is in a ready status;
   turning on a combined chip enable signal, the combined chip enable signal indicating a die number for selection of the command;
   transmitting the command;
   receiving the command at the die number selected; and
   performing the command at the die number selected.

8. The method according to claim 7, wherein the transmitting the command is performed on a computer bus.

9. The method according to claim 7, wherein a computer bus is a common computer bus.

10. The method according to claim 7, further comprising:
    turning off the combined chip enable signal after the performing of the command at the die number selected.

11. The method according to claim 7, further comprising:
    determining a second die ready to perform a second command.

12. The method according to claim 11, further comprising:
    turning on the combined chip enable signal, the combined chip enable signal indicating a second die number for selection of a next command;
    transmitting the next command;
    receiving the next command at the die number selected; and
    performing next command at the die number selected.

13. An arrangement, comprising:
    means for monitoring a bus for a change in an aggregated ready/busy indicator from a busy status to a ready status, the change in the aggregated ready/busy indicator to the ready status indicating at least one die is ready to perform a computer function;
    means for scheduling at least one logic queue with a next command to the ready die when the aggregated ready/busy indicator is in a ready status;
    means for setting the aggregated ready/busy indicator to a busy status after the scheduling of the at least one logic queue and transmitting the next command to all of the dies through a chip enable signal; and
    means for receiving the next command at all of the dies.

14. A method, comprising:
    monitoring a bus for a change in an aggregated ready/busy indicator from a busy status to a ready status for at least one die, the change in the aggregated ready/busy indicator to the ready status indicating at least one die is ready to perform a computer function;
    scheduling at least one logic queue with a next command to the ready die when the aggregated ready/busy indicator is in a ready status;
    transmitting the next command to all of the dies through a chip enable signal;
    setting the ready/busy indicator for at least one die to a busy status after the scheduling of the at least one logic queue;
    setting the aggregated ready/busy indicator to a busy indication which reflects a status of all dies; and
    monitoring the bus for a second change in an aggregated ready/busy indicator from the busy status to the ready status, wherein the change in the aggregated ready/busy indicator to the ready status indicates at least one die is ready to perform a second computer function.

15. The method according to claim 14, further comprising:
    deducing a die number from the monitoring of the bus.

16. The method according to claim 14, wherein the bus is a common bus.

17. The method according to claim 14, further comprising performing the computer function at the ready die.

18. The method according to claim 17, where the computer function is at least one of a write, read and erase function for a data storage arrangement.

* * * * *